United States Patent
Ota et al.

(10) Patent No.: US 8,368,837 B2
(45) Date of Patent: Feb. 5, 2013

(54) LIQUID CRYSTAL DISPLAY DEVICE

(75) Inventors: Takayuki Ota, Ooamishirasato (JP); Akio Tezuka, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 172 days.

(21) Appl. No.: 12/883,365

(22) Filed: Sep. 16, 2010

(65) Prior Publication Data

US 2011/0069250 A1 Mar. 24, 2011

(30) Foreign Application Priority Data

Sep. 18, 2009 (JP) ................................. 2009-216411

(51) Int. Cl.
*G02F 1/1333* (2006.01)
(52) U.S. Cl. ............................ 349/58; 362/294; 362/633
(58) Field of Classification Search ........................ None
See application file for complete search history.

(56) References Cited

U.S. PATENT DOCUMENTS

| | | | | |
|---|---|---|---|---|
| 7,682,047 B2 * | 3/2010 | Hsu et al. | ...................... | 362/294 |
| 2009/0027584 A1 * | 1/2009 | Han et al. | ......................... | 349/58 |
| 2010/0201915 A1 * | 8/2010 | Yokota | ............................. | 349/62 |

FOREIGN PATENT DOCUMENTS

JP 2008-209551 9/2008

* cited by examiner

*Primary Examiner* — Richard Kim
(74) *Attorney, Agent, or Firm* — Antonelli, Terry, Stout & Kraus, LLP.

(57) ABSTRACT

A liquid crystal display device includes: a liquid crystal display panel; and a backlight disposed to face the liquid crystal display panel, the backlight including at least a frame having a bottom surface facing the liquid crystal display panel, a reflector placed on the bottom surface of the frame, and a plurality of light sources disposed on the liquid crystal display panel side of the reflector and supported by the frame, wherein a recess protruding in the opposite direction to the liquid crystal display panel is formed in the bottom surface of the frame, the recess and the reflector constituting an air duct.

14 Claims, 5 Drawing Sheets

LIQUID CRYSTAL DISPLAY DEVICE

CROSS-REFERENCE TO RELATED APPLICATION

The present application claims priority from Japanese application JP 2009-216411 filed on Sep. 18, 2009, the content of which is hereby incorporated by reference into this application.

BACKGROUND OF THE INVENTION

1. Field of the Invention

The present invention relates to a liquid crystal display device and more particularly to a liquid crystal display device including a so-called direct-type backlight.

2. Description of the Related Art

Since a liquid crystal display panel is configured so as to independently control the transmittance amount of light in each pixel, the liquid crystal display panel is generally provided with a backlight at the back thereof. When the liquid crystal display panel has a relatively large size, a backlight referred to as a direct-type backlight is used, for example.

The direct-type backlight has a plurality of light sources such as, for example, cold cathode fluorescent lamps arranged in parallel in a plane parallel to the liquid crystal display panel. The cold cathode fluorescent lamps are supported by a housing (frame) having a reflector (reflective sheet) and the like on the inner surface thereof.

In such a backlight, the luminous efficiency of the cold cathode fluorescent lamp is reduced due to heat from the cold cathode fluorescent lamp, causing a reduction in luminance of the liquid crystal display panel. Therefore, countermeasures such as heat dissipation are generally taken.

For example, in a backlight disclosed in JP-A-2008-209551, a reflector (reflective sheet) is disposed so as to float from a frame, whereby a gap is formed between the frame and the reflector (reflective sheet). The gap is opened to the outside of the frame through holes formed in the frame. With this configuration, air between the reflector (reflective sheet) and the frame heated by heat from a light source rises, thereby being efficiently discharged from the through holes.

SUMMARY OF THE INVENTION

In recent years, however, in the above-described backlight including a surface light source, temperature is high at the center of the backlight while being low at the periphery thereof for example, along with an increase in size. In this manner, since the distribution of heat due to the light source is not uniform, generation of temperature distribution is inevitable.

The backlight disclosed in JP-A-2008-209551 in this case is designed so as to generate air convection due to temperature difference on the back surface side of a reflector with respect to a light source, in which the temperature distribution of the backlight as a surface light source is not taken into consideration.

It is an object of the invention to provide a liquid crystal display device including a backlight capable of controlling the air-cooling distribution in a plane parallel to a liquid crystal display panel.

According to the liquid crystal display device of the invention, air cooling in accordance with the temperature distribution of the backlight is performed in the backlight by forming an air duct between a reflector and a frame.

The invention can be configured as follows, for example.

(1) A liquid crystal display device of the invention includes: a liquid crystal display panel; and a backlight disposed to face the liquid crystal display panel, the backlight including at least a frame having a bottom surface facing the liquid crystal display panel, a reflector placed on the bottom surface of the frame, and a plurality of light sources disposed on the liquid crystal display panel side of the reflector and supported by the frame, wherein a recess protruding in the opposite direction to the liquid crystal display panel is formed in the bottom surface of the frame, the recess and the reflector constituting an air duct.

(2) According to the liquid crystal display device of the invention, in (1), the air duct has an air intake hole formed at one end and an air exhaust hole formed at the other end.

(3) According to the liquid crystal display device of the invention, in (2), the liquid crystal display device further includes forced ventilation means mounted on a surface of the frame on the opposite side from the liquid crystal display panel so as to cover any one ventilation hole of an air intake hole and an air exhaust hole.

(4) According to the liquid crystal display device of the invention, in (3), the forced ventilation means is configured to include a rotary fan.

(5) According to the liquid crystal display device of the invention, in (1), the light sources include cathode fluorescent lamps.

(6) According to the liquid crystal display device of the invention, in (1), the plurality of light sources include rod-like light sources and are arranged in parallel in a second direction crossing a first direction as the longitudinal direction of the rod-like light source, and a plurality of the air ducts are formed, the air ducts each having a portion extending along the first direction and being arranged in parallel in the second direction.

(7) According to the liquid crystal display device of the invention, in (6), among the plurality of air ducts, at least an air duct disposed on one side and an air duct disposed on the other side are different in width.

(8) According to the liquid crystal display device of the invention, in (7), among the plurality of air ducts, an air duct formed closest to an edge side of the bottom surface of the frame is larger in width than the other air ducts.

(9) According to the liquid crystal display device of the invention, in (6), one end of each of the plurality of air ducts reaches a common ventilation hole formed in the frame.

(10) According to the liquid crystal display device of the invention, in (9), at least some of the plurality of air ducts have a plurality of ventilation holes formed in the frame on the way to the common ventilation hole.

(11) According to the liquid crystal display device of the invention, in (9), the liquid crystal display device further includes forced ventilation means mounted on a surface of the frame on the opposite side from the liquid crystal display panel so as to cover the common ventilation hole.

(12) According to the liquid crystal display device of the invention, in (11), the forced ventilation means is configured to include a rotary fan.

(13) According to the liquid crystal display device of the invention, in (6), the light sources include cathode fluorescent lamps.

The above-described configurations are illustrative only, and the invention can be modified appropriately within a range not departing from the technical idea thereof. Exemplary configurations of the invention other than the above-described configurations will be apparent from the entire description of the specification and the drawings.

The thus configured liquid crystal display device can include a backlight capable of controlling the air-cooling distribution (that is, capable of controlling the temperature distribution) in a plane parallel to the liquid crystal display panel.

Other advantages of the invention will be apparent from the entire description of the specification.

BRIEF DESCRIPTION OF THE DRAWINGS

FIGS. 1A and 1B are configuration views showing a main part of a first embodiment of a liquid crystal display device of the invention, in which FIG. 1A is a plan view of a backlight when viewed from the back surface thereof, and FIG. 1B is a cross-sectional view taken along line b-b of FIG. 1A.

FIGS. 4A and 4B are configuration views showing a main part of the first embodiment of the liquid crystal display device of the invention, in which FIG. 4A is a plan view showing the case where forced ventilation means is attached on the back surface of the backlight, and FIG. 4B is a cross-sectional view taken along line b-b of FIG. 4A.

DESCRIPTION OF THE PREFERRED EMBODIMENTS

Figure 1A:
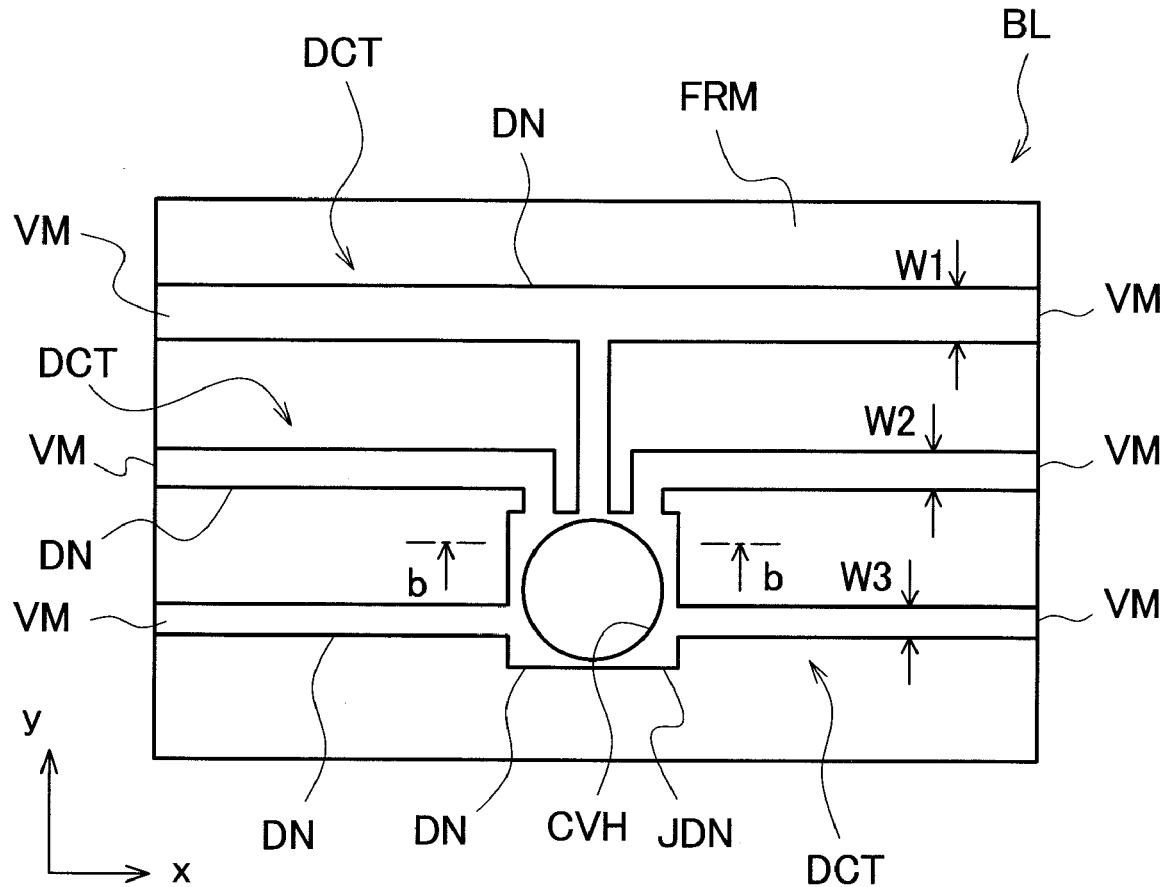

Embodiments of the invention will be described with reference to the drawings. In the drawings and embodiments, the same reference numerals and signs are assigned to the same or similar constituent elements, and the description thereof is omitted.

First Embodiment

Figure 2:
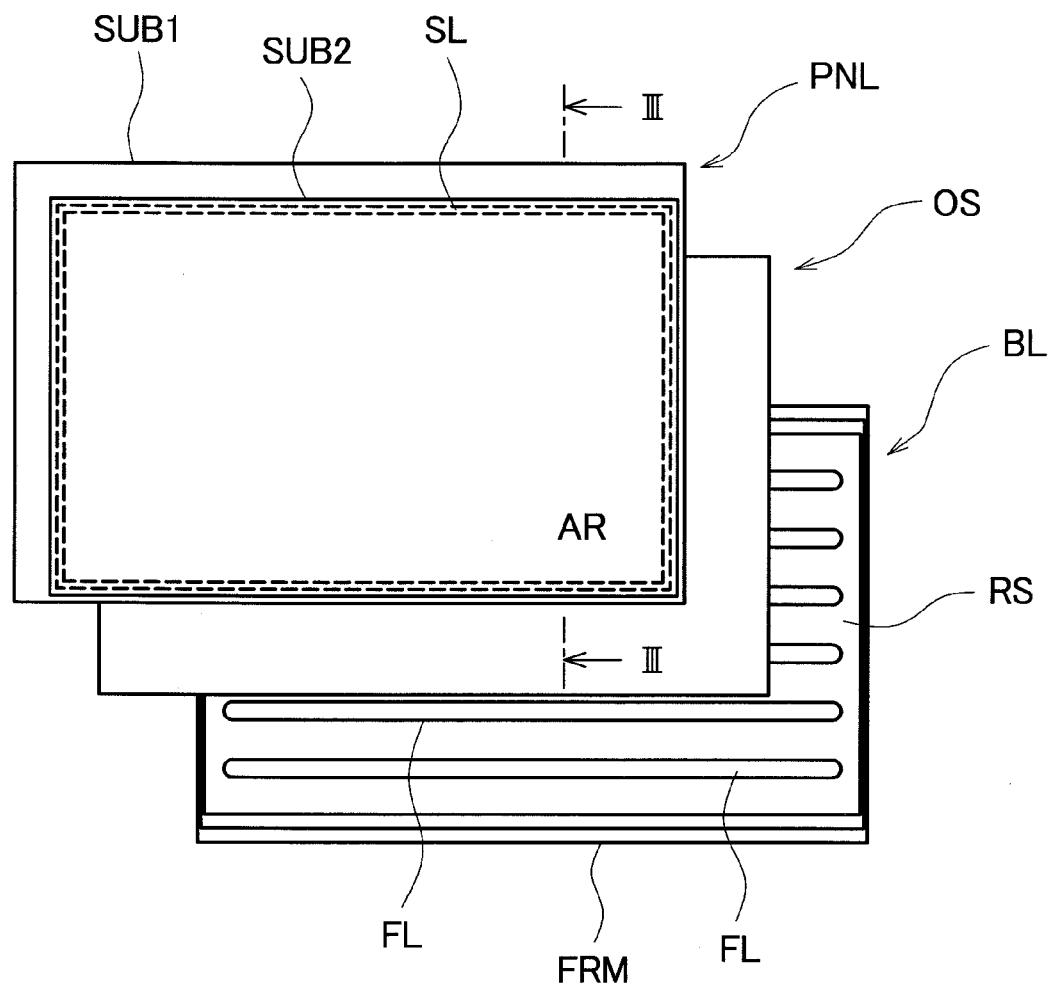
FIG. 2 is an exploded plan view showing the first embodiment of the liquid crystal display device of the invention.

FIG. 2 is a plan view showing in an exploded state a first embodiment of a liquid crystal display device of the invention.

In the liquid crystal display device, a liquid crystal display panel PNL, an optical sheet OS, and a backlight BL are disposed in this order from a viewer side (surface side of the drawing).

In the liquid crystal display panel PNL, a substrate SUB1 and a substrate SUB2 which are disposed to face each other with liquid crystal interposed therebetween constitute an envelope. The substrate SUB1 and the substrate SUB2 are fixed to each other by an annular sealing material SL formed at the peripheries of the substrate SUB1 and the substrate SUB2. The sealing material SL has also a function of sealing the liquid crystal. A region surrounded by the sealing material SL constitutes a display region AR. On surfaces of the substrate SUB1 and the substrate SUB2 on the liquid crystal side in the display region AR, a plurality of pixels (not shown) each having the liquid crystal LC as one constituent element are formed in a matrix. In each of the pixels, the transmittance ratio of light is controlled independently.

For the optical sheet OS, for example, a prism sheet and a diffuser sheet, or one having a prism sheet and a diffuser sheet stacked on each other is used. The optical sheet OS collects or diffuses light from the backlight BL, which will be described later, and thereafter guides the light to the liquid crystal display panel PNL side.

The backlight BL includes a plurality of (six in the drawing, for example) cold cathode fluorescent lamps FL arranged in parallel in a plane parallel to the liquid crystal display panel PNL. The cold cathode fluorescent lamps FL are arranged in parallel at regular intervals, for example, in the y-direction in the drawing with the tube axis thereof coinciding with, for example, the x-direction in the drawing. Each of the cold cathode fluorescent lamps FL is supported by a not-shown support to a frame (housing) FRM which is disposed to face the liquid crystal display panel PNL, and supplied with power source from electrodes (not shown) which are formed at both ends thereof, thereby emitting light. A reflector RS (reflective sheet) is placed on a surface (bottom surface) of the frame FRM on the opposite side from the liquid crystal display panel PNL with respect to the cold cathode fluorescent lamp FL. Light which is irradiated from the cold cathode fluorescent lamp FL to the frame FRM side is reflected to the liquid crystal display panel PNL side by the reflector RS. The reflector RS may not necessarily be of a plate type or sheet type, but include those which can be recognized as a reflective member, for example.

The liquid crystal display panel PNL, the optical sheet OS, and the backlight BL are made into a module by using a not-shown upper frame (indicated by reference sign UFR in FIG. 3), a not-shown middle frame (indicated by reference sign MFR in FIG. 3), and the frame FRM (lower frame), thereby forming a liquid crystal display device.

Figure 3:
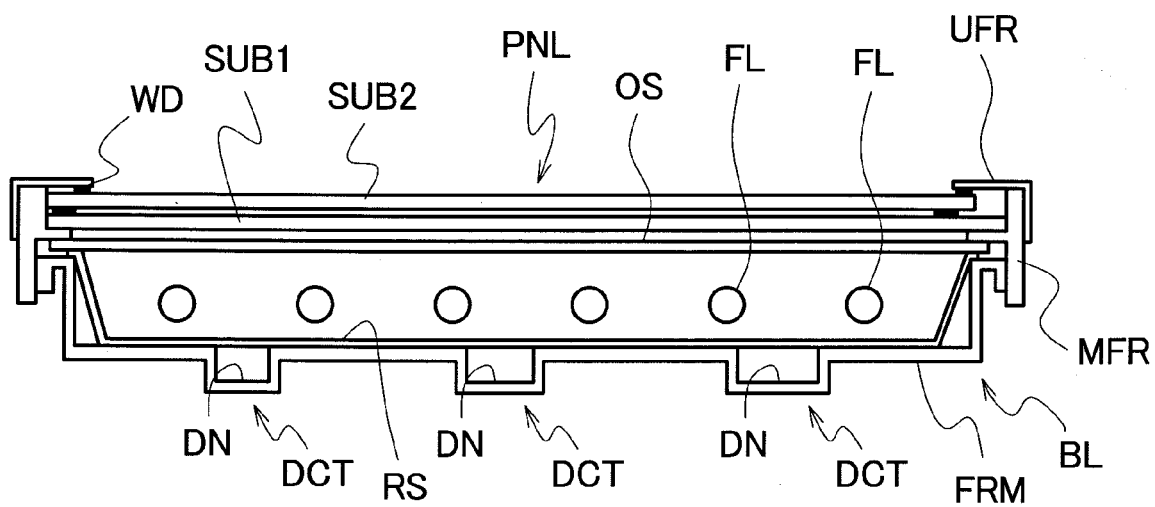
FIG. 3 shows a cross section taken along line III-III of FIG. 1A.

FIG. 3 shows the configuration of the liquid crystal display panel PNL, the optical sheet OS, and the backlight BL when they are made into a module, and is a cross-sectional view taken along line of III-III FIG. 2. The frame FRM of the backlight BL has a box shape, for example. On the bottom surface of the frame, the reflector RS is placed. In this case, recesses DN (protrusions) protruding in the opposite direction to the liquid crystal display panel PNL are formed in parts of the bottom surface of the frame FRM. The recess DN forms a tubular space together with the reflector RS. The tubular space constitutes an air duct DCT. The air duct DCT will be described in detail later. The recess DN can be formed by shaping a part of the bottom surface of the frame FRM into a U-shape, for example. Alternatively, the recess may be formed by disposing a drawn part in the bottom surface of the frame FRM.

In the backlight BL, the plurality of cold cathode fluorescent lamps FL are arranged in parallel in a virtual plane parallel to the bottom surface of the backlight. As described above, the cold cathode fluorescent lamps FL are supported to the frame FRM via not-shown supports. In the backlight BL, the optical sheet OS is disposed so as to cover the cold cathode fluorescent lamps FL. The optical sheet OS is held by the frame-like middle frame MFR secured to the frame FRM, between the backlight BL and the middle frame. The liquid crystal display panel PNL is placed on the upper surface of the middle frame MFR. The liquid crystal display panel PNL is held by the frame-like upper frame UFR secured to the middle frame MFR, between the middle frame MFR and the upper frame. In the upper frame UFR, a window WD formed of an opening is formed at a portion facing the display region AR (refer to FIG. 2) of the liquid crystal display panel PNL.

Figure 1B:
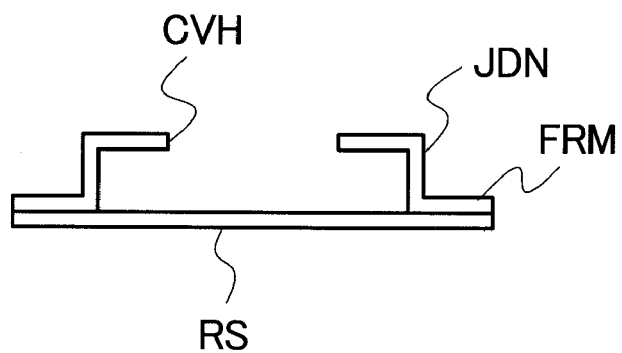

FIG. 1A shows the backlight BL when viewed from the back surface side. FIG. 1A shows the backlight BL in a state where the backlight shown in FIG. 2 is rotated laterally about the y-direction in the drawing so that right and left are reversed. FIG. 1B shows a cross-sectional view taken along line b-b of FIG. 1A.

The recesses DN protruding in the opposite direction to the liquid crystal display panel PNL are formed in parts of the back surface of the frame FRM of the backlight BL, and the recess DN constitutes the air duct DCT together with the reflector RS, as described above.

The air ducts DCT are formed such that three air ducts DCT are arranged in parallel in the y-direction in the drawing and extend in the x-direction, for example. Each of the air ducts DCT is formed such that both ends thereof are extended to reach both sides of the frame FRM. The air duct DCT has ventilation openings VM at the both ends. In the embodiment, the air duct DCT is formed such that the extending direction thereof coincides with the tube axis direction (in the x-direction in the drawing) of the cold cathode fluorescent lamp FL.

The air ducts DCT have tube widths of W1, W2, and W3, respectively from the upper side to the lower side in the drawing. The tube widths are formed so as to have a relation of W1>W2>W3. This is for positioning the air duct DCT having a large tube width on the upper side and positioning the air duct DCT having a small tube width on the lower side when the liquid crystal display device is used in a standing state on a horizontal plane. That is, in the liquid crystal display device used in a standing state on a horizontal plane, a temperature distribution in which the temperature is high on the upper side while being low on the lower side is generated due to heat convection or the like. Therefore, a cooling effect is increased by disposing the air duct DCT having a large tube width on the upper side, and a cooling effect is decreased by disposing the air duct DCT having a small tube width on the lower side.

The relation among W1, W2, and W3 is not limited to the relation of W1>W2>W3. The tube widths can be in any relation. For example, the tube widths may be equal to one another, or only the tube width W1 on the uppermost side may be larger than the other widths.

Each of the air ducts DCT is connected to a connection recess JDN (connection protrusion) having a relatively large area at substantially the center of the frame FRM on the lower side. In the frame FRM constituting the connection recess JDN, a common ventilation hole CVH is formed as shown in FIG. 1B. With this configuration, air can be forcibly flowed in each of the air ducts DCT with one of the ventilation opening VM and the common ventilation hole CVH as an air intake hole and the other of the ventilation opening VM and the common ventilation hole CVH as an air exhaust hole.

Figure 4A:
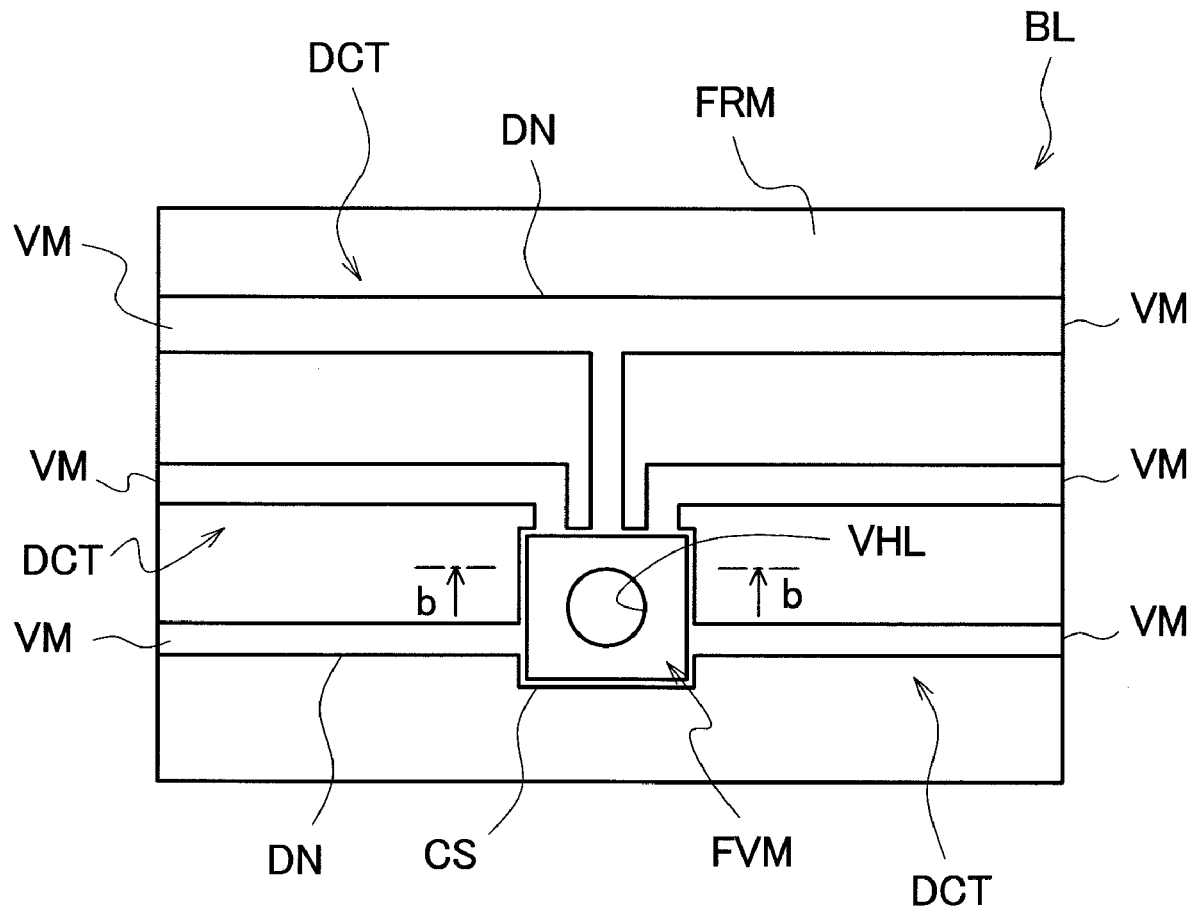
Figure 4B:
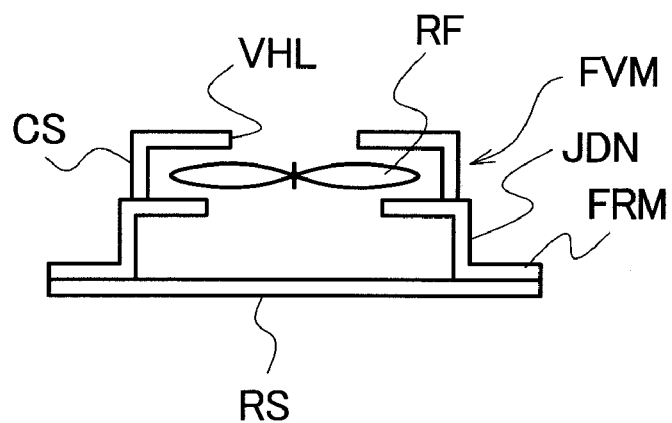

FIGS. 4A and 4B are configuration views showing the case where forced ventilation means FVM for forcibly flowing air in the air ducts DCT is mounted, and correspond to FIGS. 1A and 1B, respectively. In FIGS. 4A and 4B, the forced ventilation means FVM includes a rotary fan RF housed in a box-like case CS, and is mounted on the connection recess JDN formed in the frame FRM so as to cover the common ventilation hole CVH. A ventilating hole VHL substantially coaxial with the common ventilation hole CVH is formed in the case CS of the forced ventilation means FVM. In such a configuration, by rotating the rotary fan RF in one direction, air can be forcibly flowed in each of the air ducts DCT with the common ventilation hole CVH as an air intake hole and the ventilation opening VM as an air exhaust hole. By rotating the rotary fan RF in the other direction, air can be forcibly flowed in each of the air ducts DCT with the ventilation opening VM as an air intake hole and the common ventilation hole CVH as an air exhaust hole.

In the thus configured liquid crystal display device, by forming the recess DN in the frame FRM between the reflector RS and the frame FRM, the air duct DCT can be easily formed in the backlight BL. The air ducts DCT can be formed in an efficient arrangement (pattern) in accordance with the temperature distribution in a plane of the backlight BL as a surface light source. Therefore, the air-cooling distribution of the backlight BL can be easily controlled by the air ducts DCT. Moreover, since the air duct DCT uses the reflector RS disposed close to the cold cathode fluorescent lamp FL as a part of the duct wall, it is possible to improve the efficiency of cooling in the vicinity of the cold cathode fluorescent lamp FL.

Second Embodiment

Figure 5:
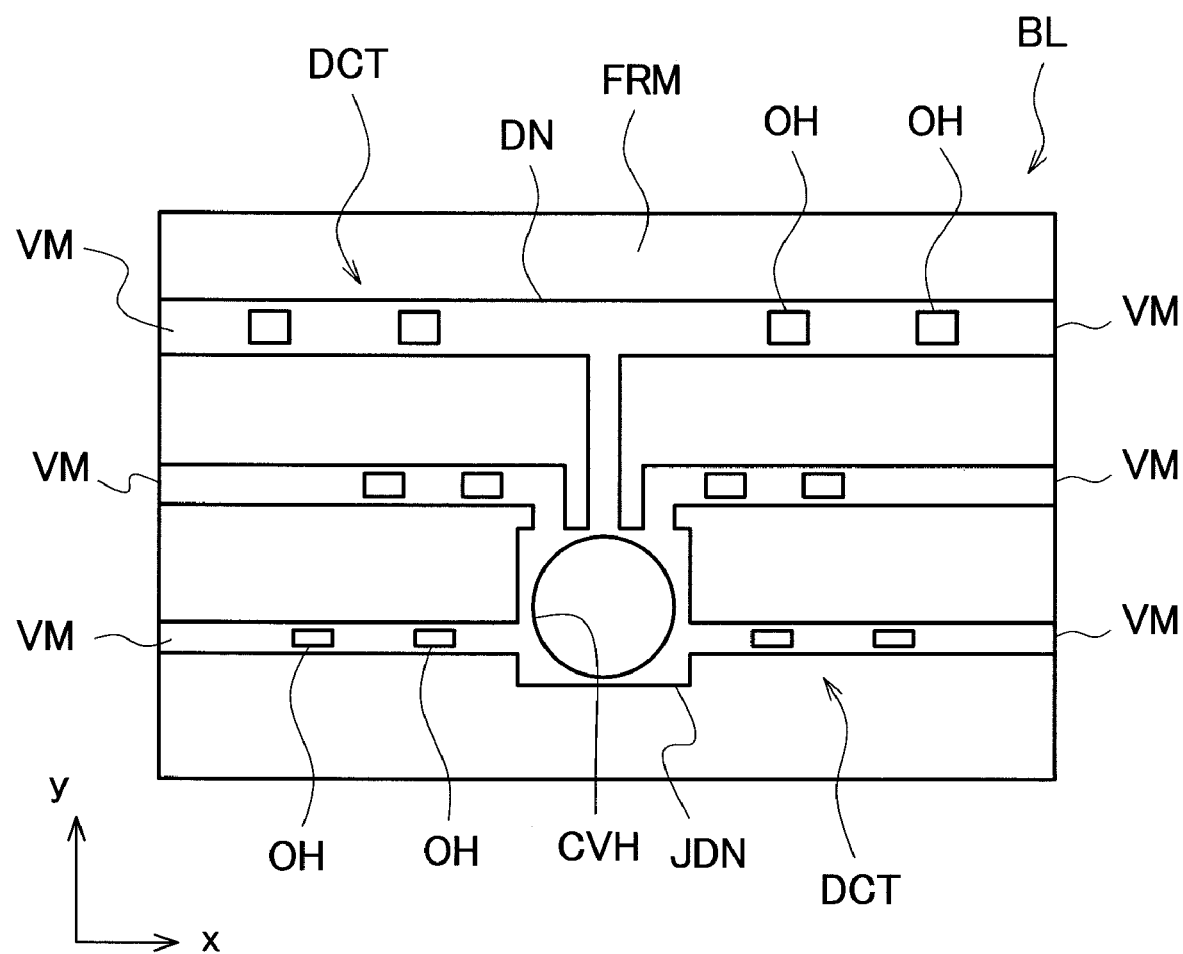
FIG. 5 is a configuration view showing a main part of a second embodiment of a liquid crystal display device of the invention.

FIG. 5 shows the configuration of a second embodiment of a liquid crystal display device of the invention and corresponds to FIG. 1A.

The configuration of FIG. 5 differs from that of FIG. 1A in that ventilation holes OH are formed in the air duct DCT. The ventilation hole OH is formed separately from the ventilation opening VM which is formed at the end of the air duct DCT and formed to have a function similar to that of the ventilation opening VM. In the case of this embodiment, four ventilation holes OH are disposed symmetrically about the center in each of the air ducts DCT. The respective ventilation holes OH in the air ducts DCT at the upper, middle, and lower stages are disposed so as to be different in position from the center. With this configuration, the amount and rate of the air flowing in each of the air ducts DCT can be controlled differently depending on the regions. As a result, the air-cooling effect can be controlled differently depending on the regions. The reason configured as described above is as follows. The temperature distribution on the surface of the frame FRM varies depending on the kinds and sizes of a liquid crystal display device. By determining the number and arrangement of the ventilation holes OH in accordance with the kinds and sizes, it is possible to perform control such as unifying the temperature distribution over the entire area of the surface of the frame FRM.

In view of this, the arrangement of the ventilation holes OH formed in the air ducts DCT is not limited to the arrangement shown in FIG. 5. The arrangement of the ventilation holes OH can be arbitrarily modified.

Third Embodiment

Figure 6:
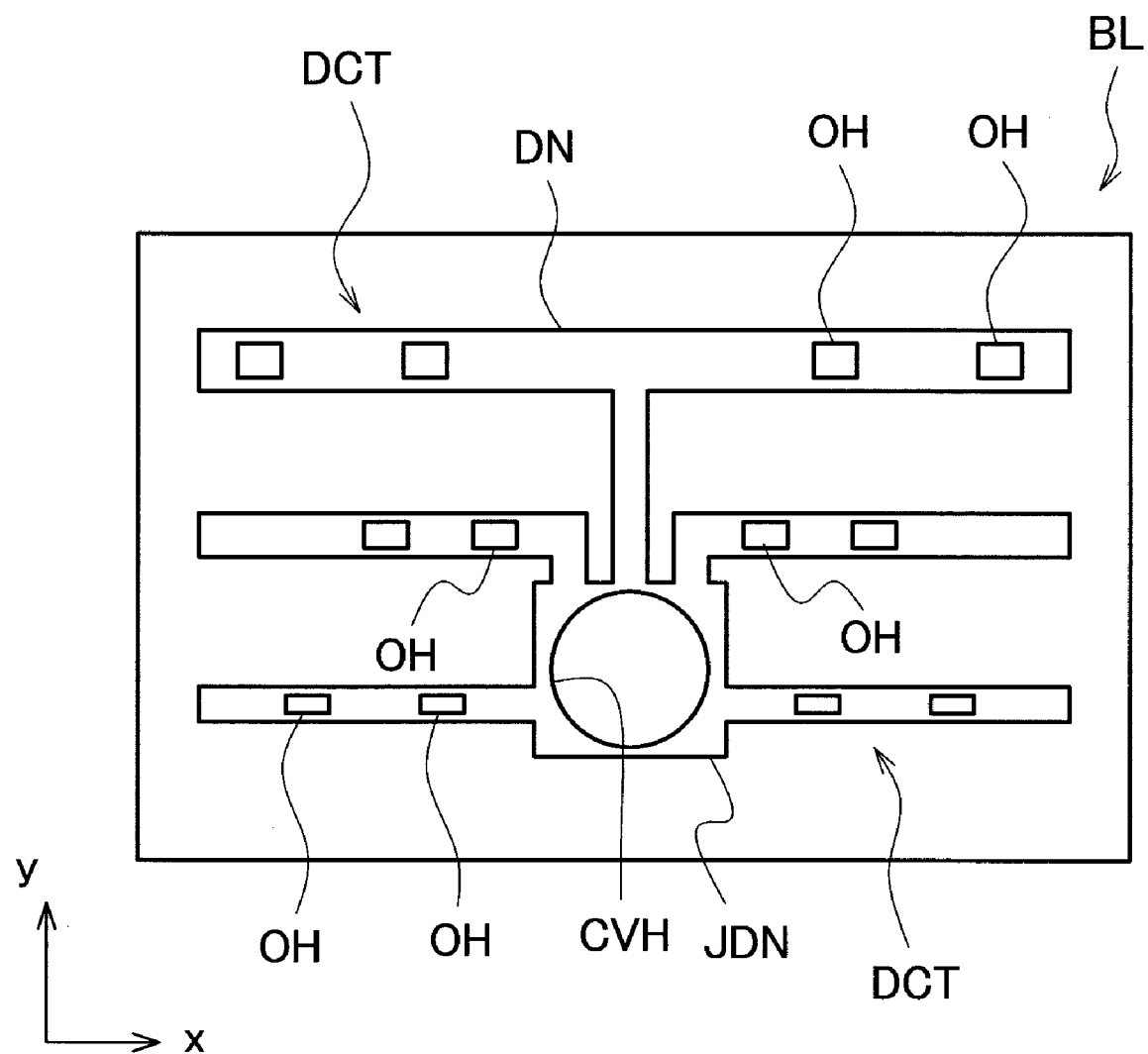
FIG. 6 is a configuration view showing a main part of a third embodiment of a liquid crystal display device of the invention.

FIG. 6 shows the configuration of a third embodiment of a liquid crystal display device of the invention and corresponds to FIG. 5.

The configuration of FIG. 6 differs from that of FIG. 5 in that the ends of the recess DN of the frame FRM constituting the air duct DCT do not reach the end sides of the frame FRM and each are formed at a position in front of the end side. Therefore, the ventilation openings VM shown in FIG. 5 are not provided. However, the ventilation holes OH are formed in the air duct DCT, and the ventilation hole OH has a function similar to that of the ventilation opening VM. Therefore, the absence of the ventilation opening VM does not cause any problem.

Fourth Embodiment

In any of the first to third embodiments, the air ducts DCT are disposed such that the extending direction thereof coincides with the tube axis direction of the cold cathode fluorescent lamp FL. However, the air ducts DCT may be disposed in, for example, a direction crossing the tube axis direction of the cold cathode fluorescent lamp FL. Even in this case, the air-cooling distribution can be controlled by the air ducts DCT, and the air ducts DCT can be configured close to the cold cathode fluorescent lamps FL with the reflector RS interposed therebetween. Therefore, a sufficient cooling effect can be provided.

In view of this, it is apparent that the air ducts DCT may be configured in such a pattern that the air ducts run in a meandering shape substantially over the entire area of the back surface of the frame FRM, or in a grid-like pattern.

While the invention has been described by using the embodiments, the configurations described in the embodiments are illustratively only. The invention can be modified appropriately within a range not departing from the technical idea thereof. The configurations described in the embodiments may be used in combination as long as they do not conflict with each other.

Moreover, the invention may be applied to a liquid crystal display device having a backlight using a hot cathode lamp or LED instead of the cold cathode fluorescent lamp FL.

What is claimed is:

1. A liquid crystal display device comprising:
   a liquid crystal display panel; and
   a backlight disposed to face the liquid crystal display panel, the backlight including at least a frame having a bottom surface facing the liquid crystal display panel, a reflector placed on the bottom surface of the frame, and a plurality of light sources disposed on the liquid crystal display panel side of the reflector, wherein
   a recess of the frame protruding in the opposite direction to the liquid crystal display panel is formed in the bottom surface of the frame, the recess of the frame and the reflector constituting an air duct.

2. The liquid crystal display device according to claim 1, wherein the air duct has an air intake hole formed at one end and an air exhaust hole formed at the other end.

3. The liquid crystal display device according to claim 2, further comprising forced ventilation means mounted on a surface of the frame on the opposite side from the liquid crystal display panel so as to cover any one ventilation hole of an air intake hole and an air exhaust hole.

4. The liquid crystal display device according to claim 3, wherein the forced ventilation means is configured to include a rotary fan.

5. The liquid crystal display device according to claim 1, wherein the light sources include cathode fluorescent lamps.

6. The liquid crystal display device according to claim 1, wherein the plurality of light sources include rod-like light sources and are arranged in parallel in a second direction crossing a first direction as the longitudinal direction of the rod-like light source, and
   a plurality of the air ducts are formed, the air ducts each having a portion extending along the first direction and being arranged in parallel in the second direction.

7. The liquid crystal display device according to claim 6, wherein among the plurality of air ducts, at least an air duct disposed on one side and an air duct disposed on the other side are different in width.

8. The liquid crystal display device according to claim 7, wherein among the plurality of air ducts, an air duct formed closest to an edge side of the bottom surface of the frame is larger in width than the other air ducts.

9. The liquid crystal display device according to claim 6, wherein one end of each of the plurality of air ducts reaches a common ventilation hole formed in the frame.

10. The liquid crystal display device according to claim 9, wherein at least some of the plurality of air ducts have a plurality of ventilation holes formed in the frame on the way to the common ventilation hole.

11. The liquid crystal display device according to claim 9, further comprising forced ventilation means mounted on a surface of the frame on the opposite side from the liquid crystal display panel so as to cover the common ventilation hole.

12. The liquid crystal display device according to claim 11, wherein the forced ventilation means is configured to include a rotary fan.

13. The liquid crystal display device according to claim 6, wherein the light sources include cathode fluorescent lamps.

14. The liquid crystal display device according to claim 1, wherein the recess of the frame constituting part of the air duct, includes the bottom surface of the frame facing the liquid crystal display panel forming a bottom and sides of the recess, the bottom and sides of the recess formed by the bottom surface of the frame and the reflector constituting the air duct.

* * * * *